United States Patent [19]

Sanctuary et al.

[11] 3,834,375

[45] Sept. 10, 1974

[54] RESPIRATORY GAS ANALYZER FOR MEASURING AND DISPLAYING OXYGEN UPTAKE IN EXPIRED AIR

[75] Inventors: Clifford Sanctuary, Palos Verdes Estates; Donald C. Woods, Big Bear City; John A. Bachman, Woodland Hills, all of Calif.

[73] Assignee: Del Mar Engineering Laboratories, Los Angeles, Calif.

[22] Filed: July 20, 1973

[21] Appl. No.: 380,975

Related U.S. Application Data

[62] Division of Ser. No. 243,369, April 12, 1972.

[52] U.S. Cl. ............... 128/2.07, 73/23 R, 128/2.08
[51] Int. Cl. ............................................. A61b 5/08
[58] Field of Search ........................ 128/2.07, 2.08; 235/151.35; 73/23 R

[56] References Cited
UNITED STATES PATENTS

| | | | |
|---|---|---|---|
| 3,082,761 | 3/1963 | Engelder | 128/2.07 |
| 3,309,684 | 3/1967 | Kahn et al. | 128/2.07 X |
| 3,511,237 | 5/1970 | Jaeger | 128/2.08 |
| 3,698,384 | 10/1972 | Jones | 128/2.07 |
| 3,759,249 | 9/1973 | Fletcher | 128/2.07 X |

OTHER PUBLICATIONS

Technology Inc. Bulletin No. 601, Mar. 1967, pp. 1–2.

Hilberman, M. et al., Journ. of Assoc. for Advance of Med. Instrumentation, Vol. 6, No. 1, Jan.-Feb., 1972, pp. 65–69.

Vallbona, C. et al. Computers & Biomed. Research, Vol. 4, No. 6, (1971) pp. 623–633.

Primary Examiner—Kyle L. Howell
Attorney, Agent, or Firm—Jessup & Beecher

[57] ABSTRACT

A respiratory gas analyzer is provided in the form of a breath gas measuring instrument and system in which the oxygen uptake in the expired air of a subject, and the oxygen consumption per unit of weight of the subject, are periodically calculated and digitally displayed. A true sample of the expired air is accumulated by gradual extraction within the system of the invention on a periodic basis for gas analysis, and a computer included in the system calculates the oxygen depletion of each total sample to standard temperature and at ambient pressure and provides a digital display of oxygen uptake. An additional computer is included in the system which responds to the compensated oxygen depletion and to the subject's weight to provide a digital display of the oxygen uptake per unit weight of the subject.

6 Claims, 13 Drawing Figures

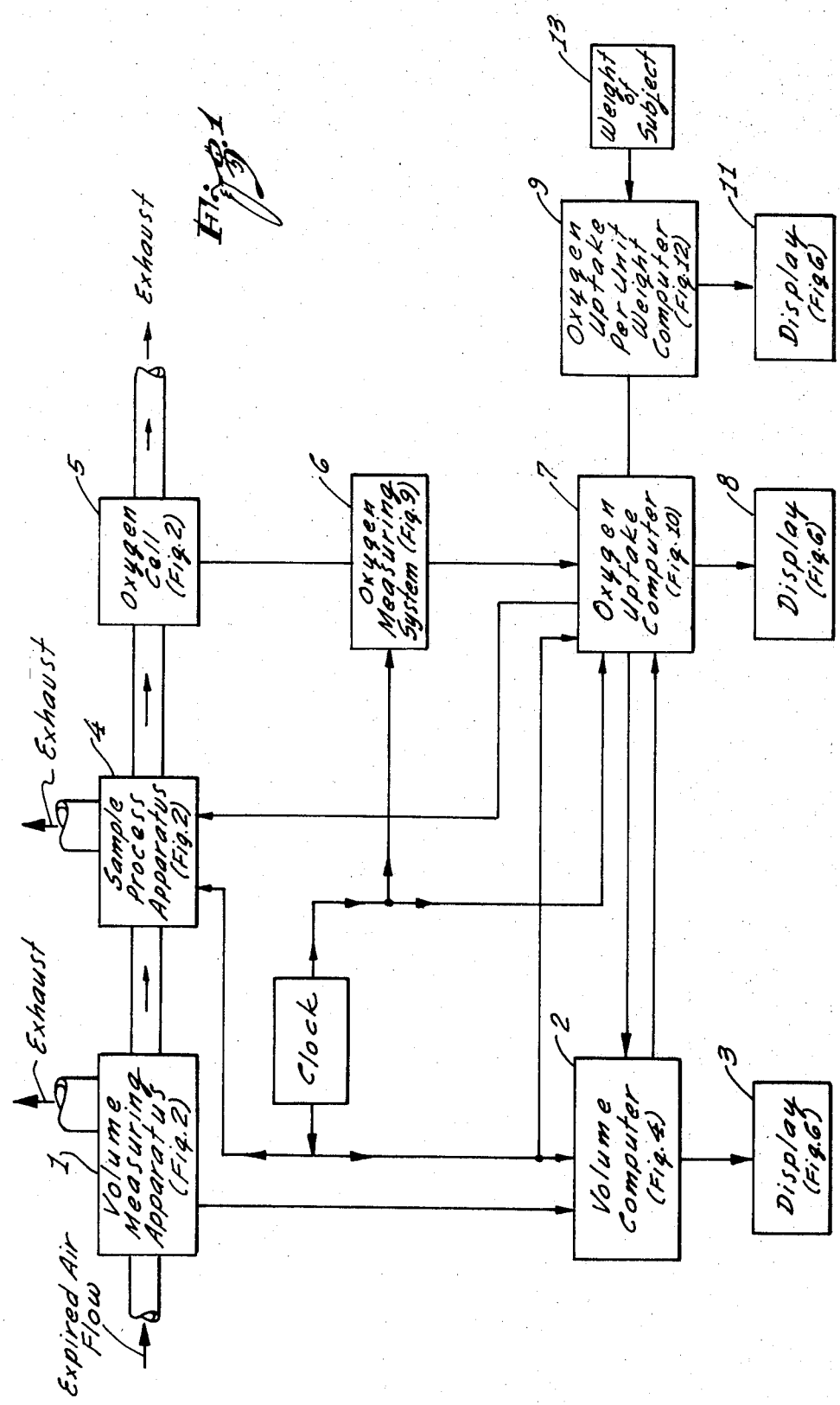

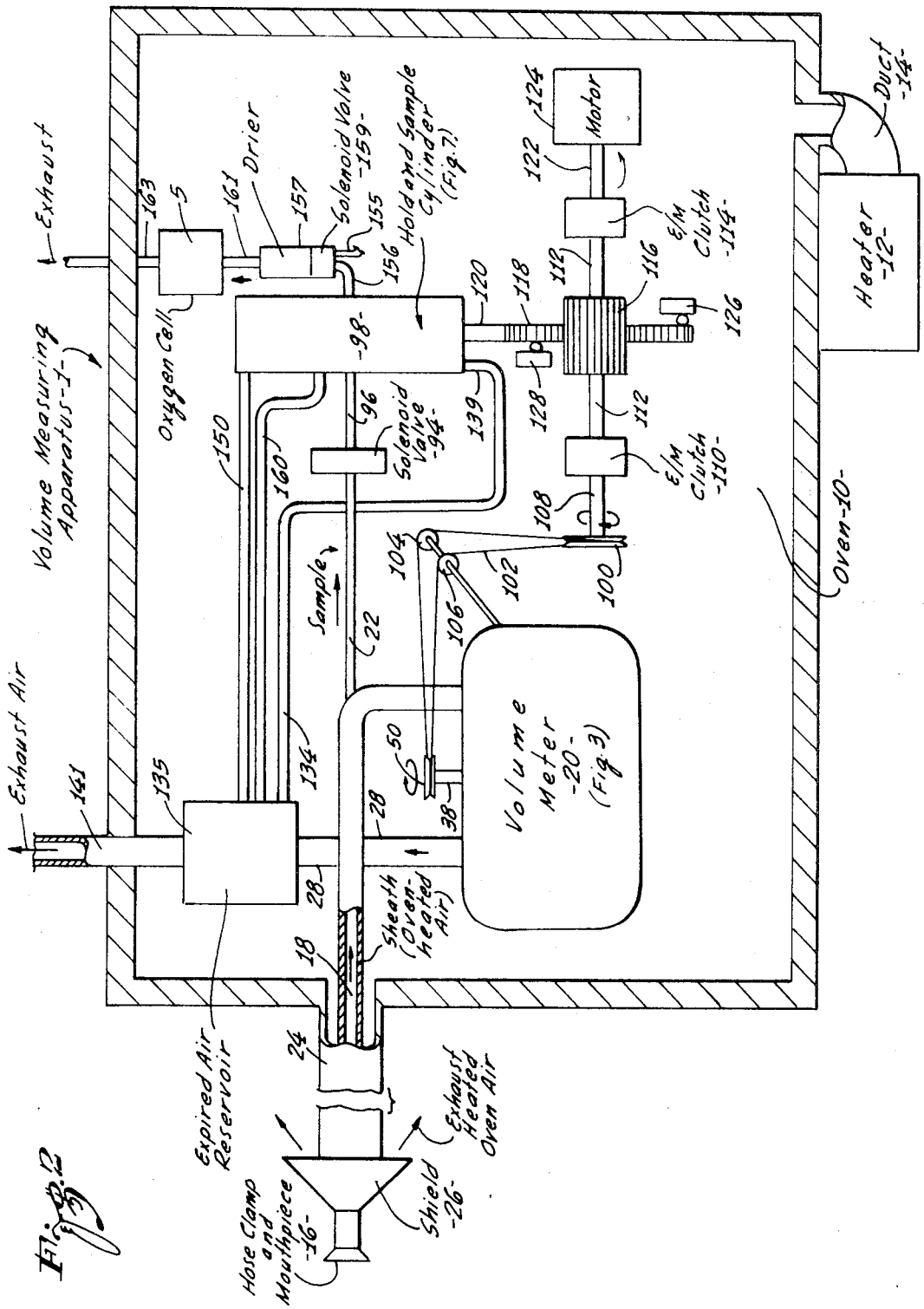

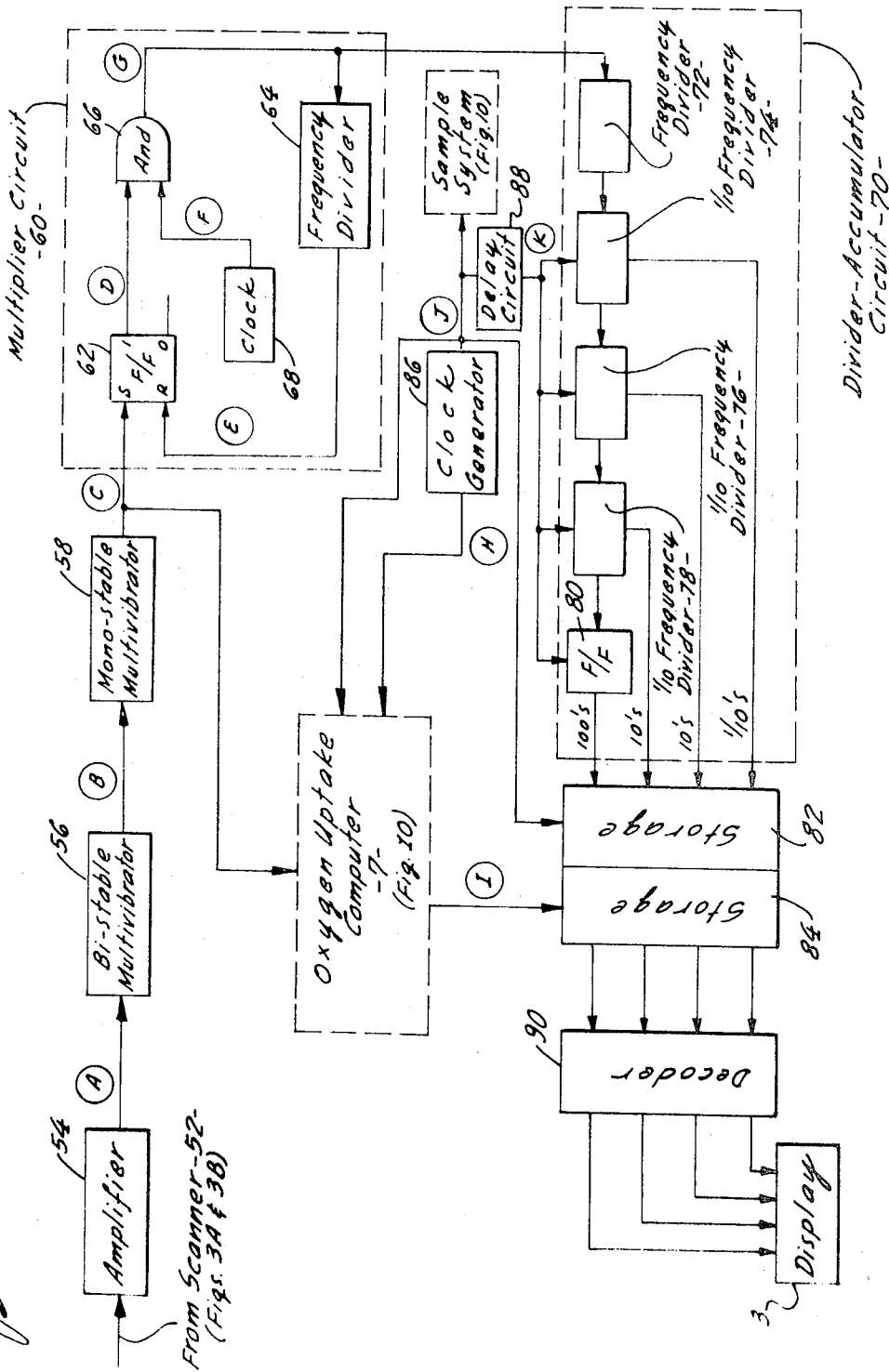

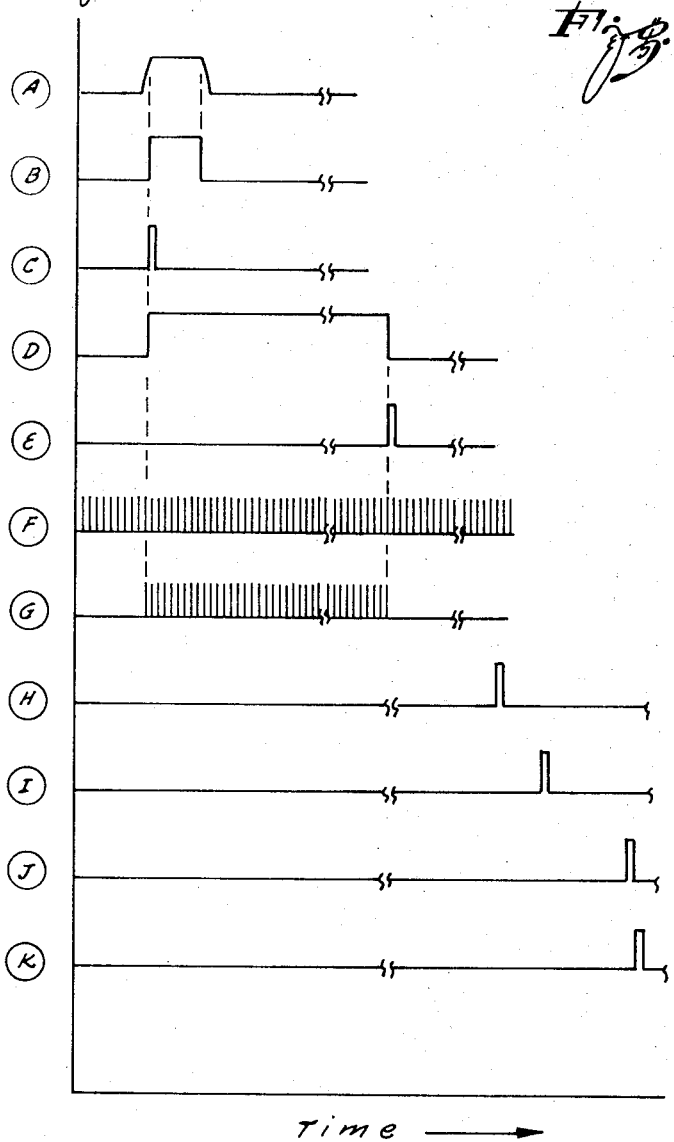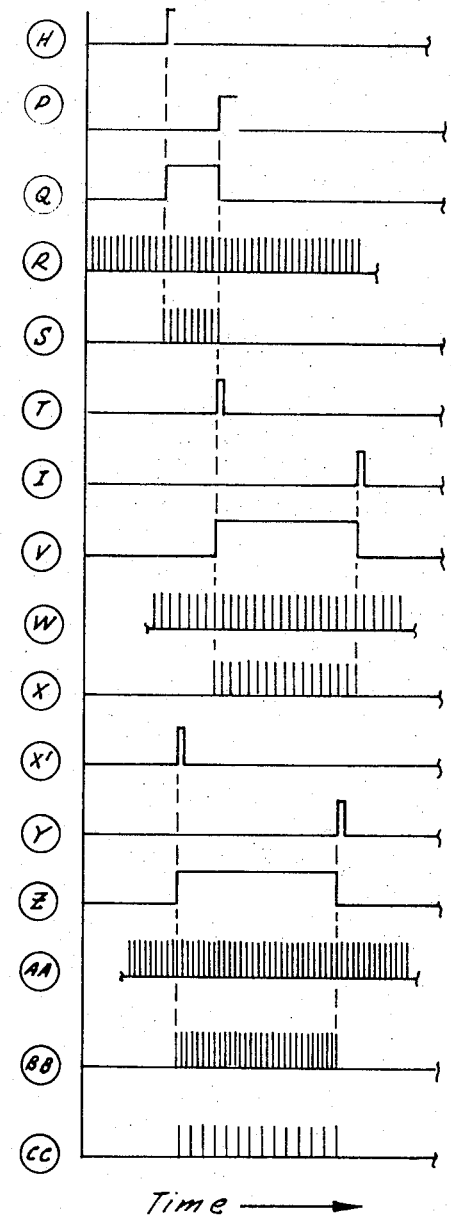

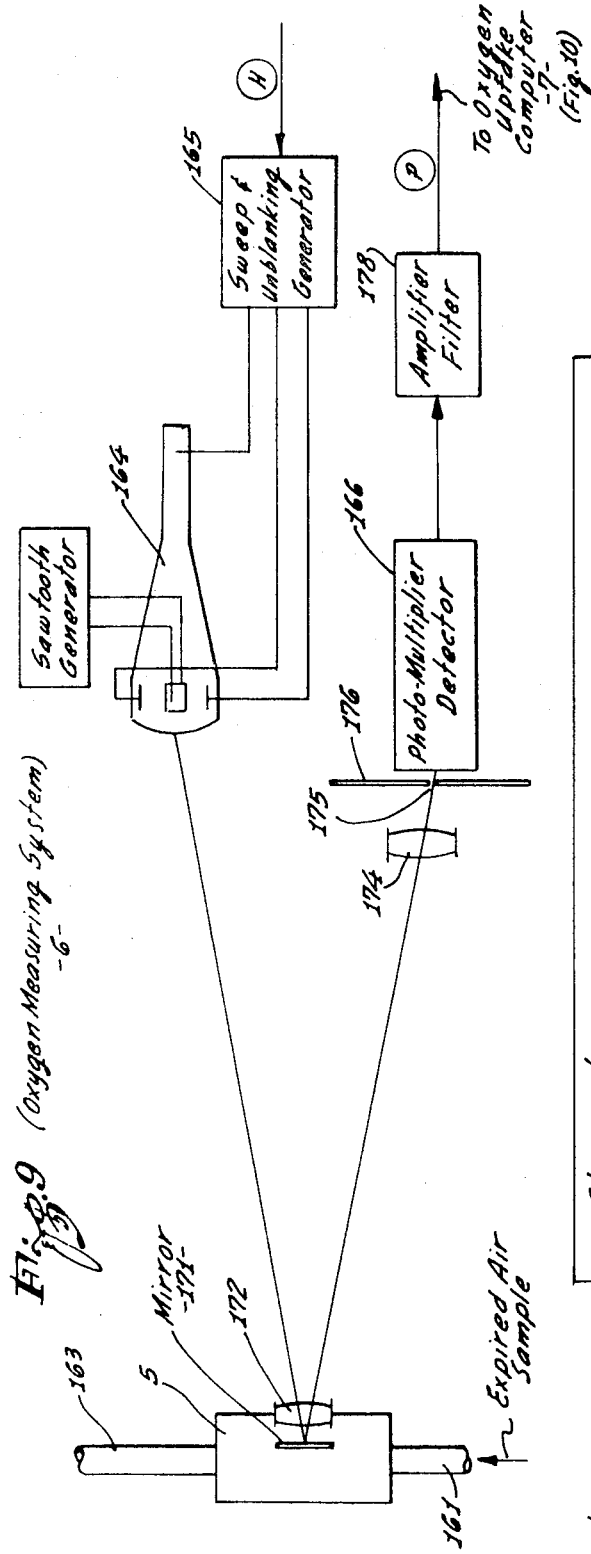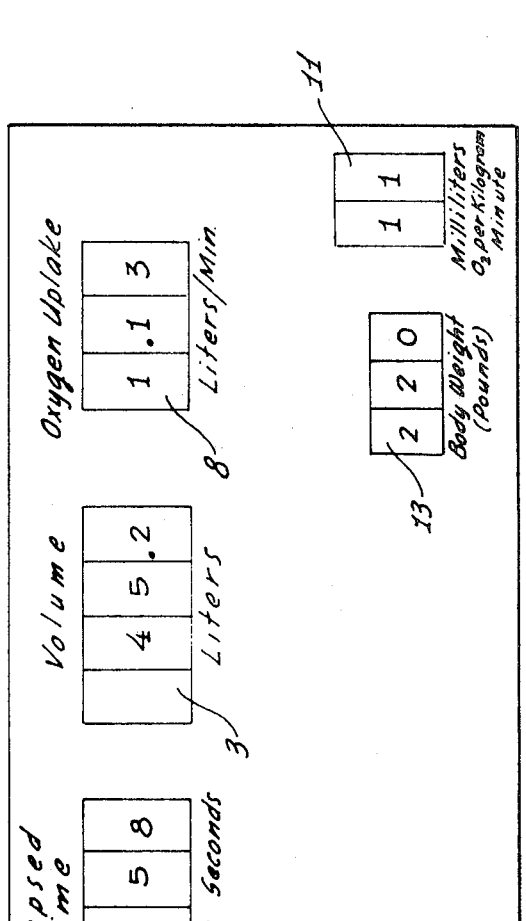

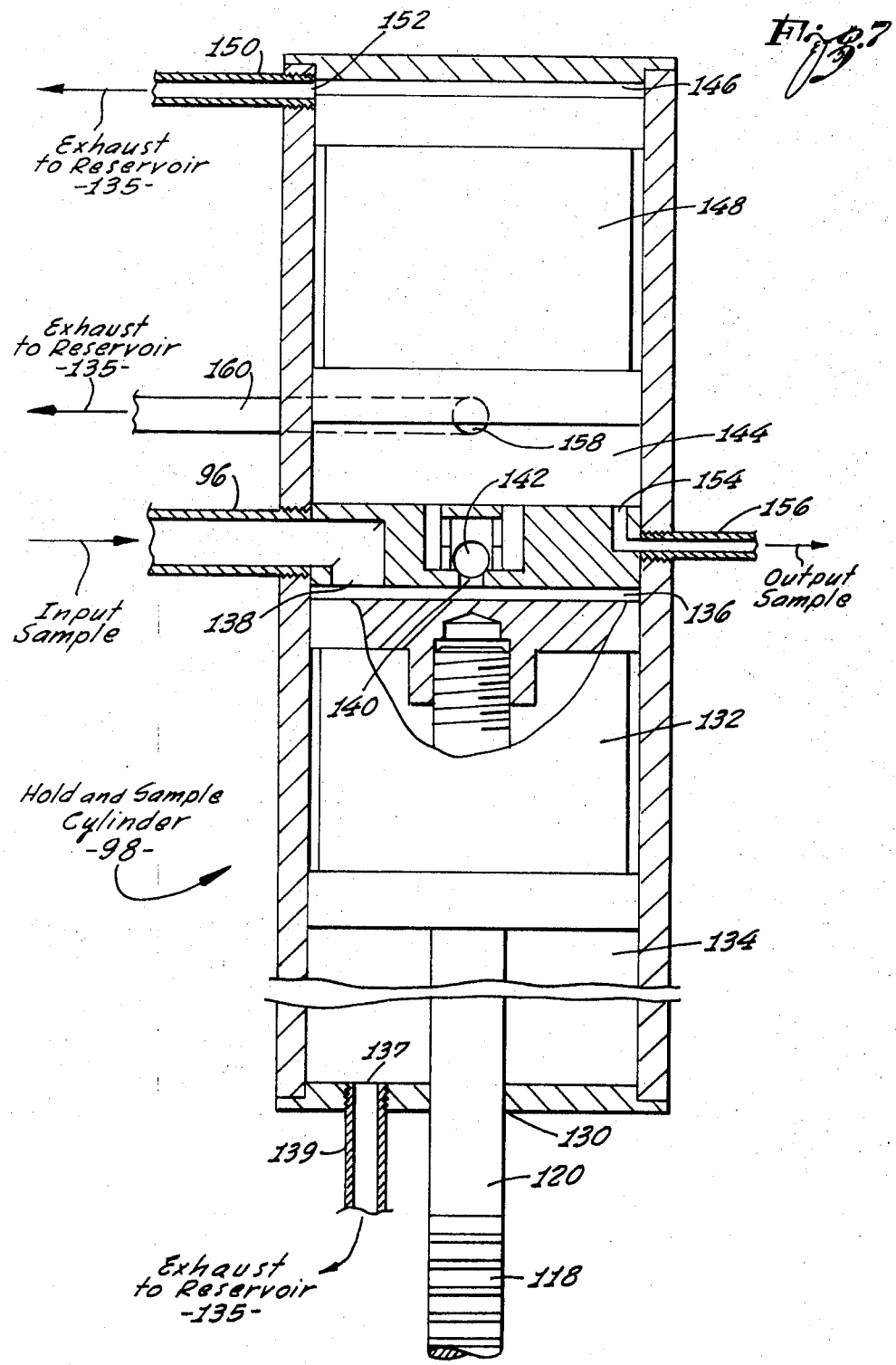

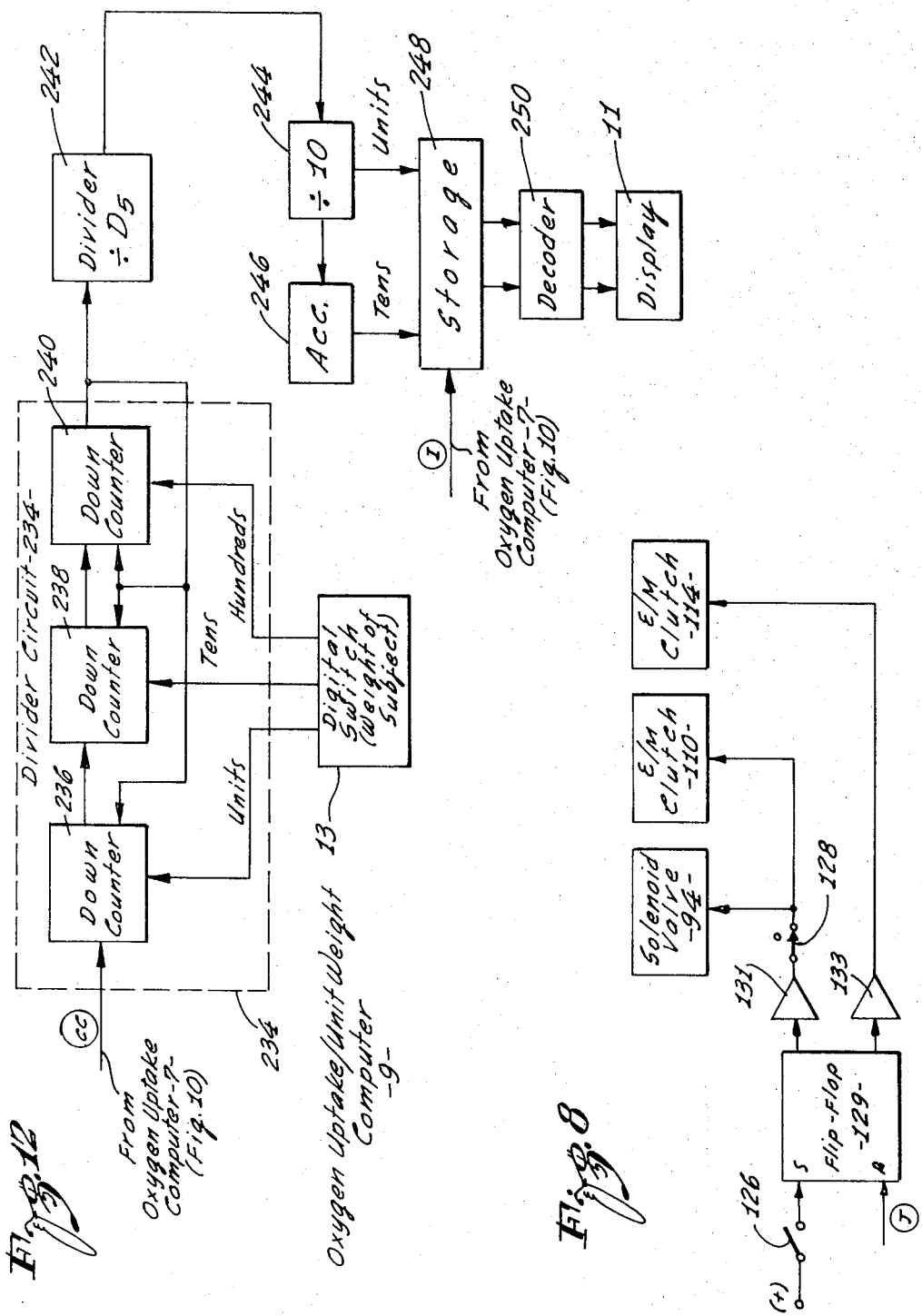

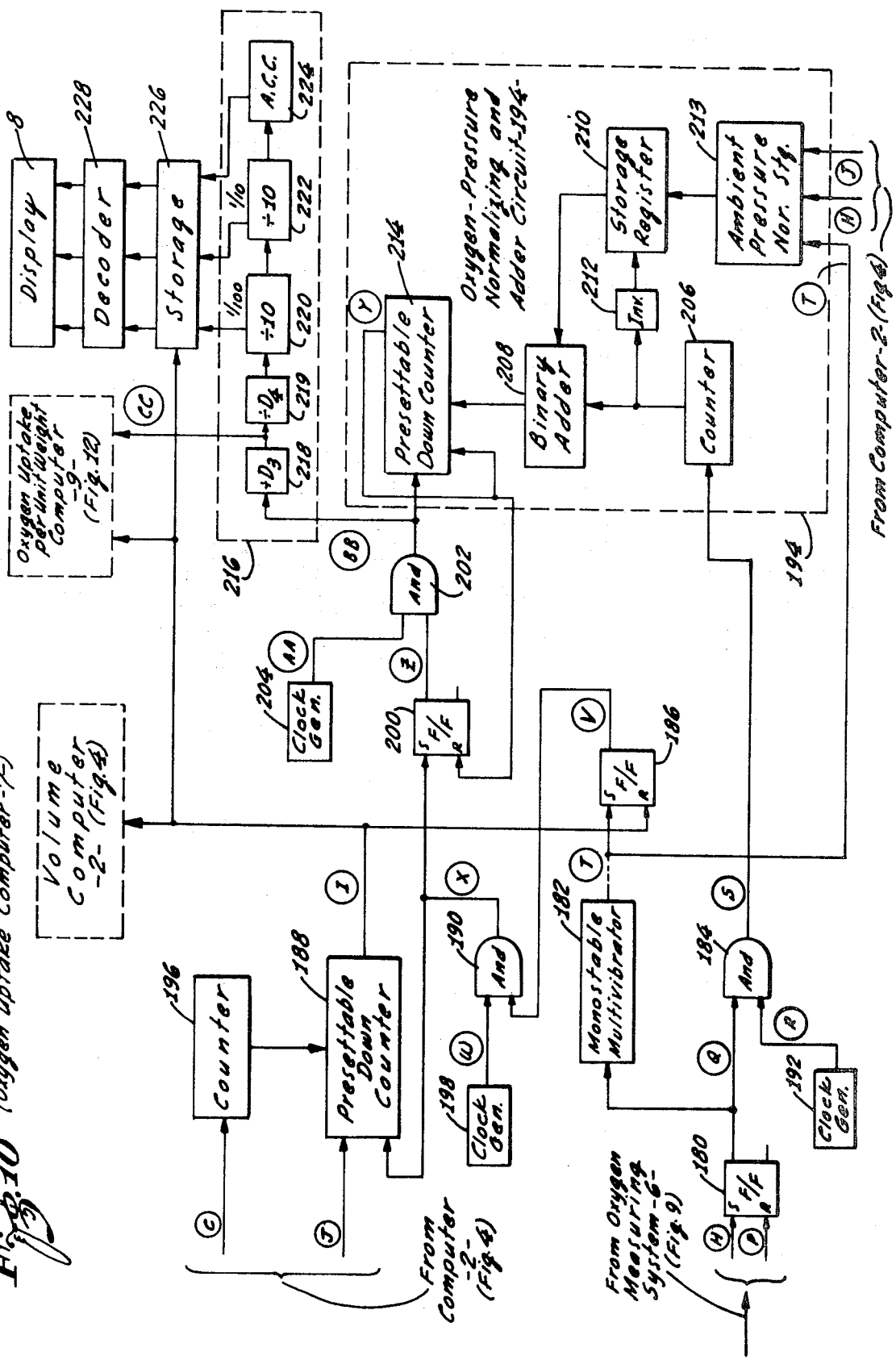

RESPIRATORY GAS ANALYZER FOR MEASURING AND DISPLAYING OXYGEN UPTAKE IN EXPIRED AIR

This application is a division of Copending application Ser. No. 243,369 filed Apr. 12, 1972.

BACKGROUND OF THE INVENTION

Pulmonary function tests involve the measurement of the volume of the expired air from the subject and of the oxygen uptake in the expired air. Many devices are available in the prior art for the determination of the total volume of expired air from the subject during a measured period of time. These devices include, for example, spirometers, plethysmographs, and pneumotachographs; the spirometers being the most commonly used for the purpose at the present time. Likewise, numerous devices are available in the prior art for determining the oxygen uptake, and methods utilized are based on the chemical and physical characteristics of oxygen.

However, the prior art devices for the most part either perform with low accuracy or require especially skilled personnel for their operation. Moreover, the prior art devices, and especially those which provide in any way accurate results, are extremely high in cost and have excessive space requirements. Specifically, in the operation of the prior art devices, such as those referred to above, extensive and time consuming manual calculations are necessary, which not only introduce costly delays into the process, but also introduce possible human errors in the conversion of the recorded data to standard conditions of temperature and pressure for comparative purposes.

Automatic systems have been devised in the past which incorporate general purpose computers for the calculation and display of portions of the desired results. However, these latter systems are unduly complex and expensive.

The system and apparatus of the present invention, on the other hand, provides an improved respiratory air analyzer which is particularly constructed for the periodic measurement and immediate display of the oxygen uptake in the expired air, corrected to a standard temperature (0°C) and at ambient pressure; and for the periodic measurement and immediate display of the oxygen uptake in the expired air per unit of the weight of the subject.

The system and apparatus of the invention has an advantage in that it is relatively simple and inexpensive in its construction, and yet it operates with a high degree of accuracy. In addition, the system and apparatus of the invention is advantageous in that it requires no particular skills on the part of the operator, since it functions on an automatic basis and displays digitally the desired parameters of the expired air.

In brief, therefore, the system and apparatus of the invention comprises a respiratory air analyzer-computer, which measures computes and displays the oxygen uptake in the expired air of the subject at standard temperature and ambient pressure, and which also computes and displays the oxygen uptake in the expired air per unit of weight of the subject.

In the respiratory gas analyzer to be described, a positive displacement volume meter and an associated sampling and correcting means are enclosed in an oven environment, and are used to measure the volume of air expired from a subject. This volume, measured at body temperature and ambient pressure, saturated with water vapor (BTPS), is digitally displayed by the apparatus at the end of each minute. A gas analyzer is included in the system in the embodiment of the invention to be described, and is also enclosed in the oven environment. The gas analyzer is used to determine the oxygen depletion (uptake) of an accumulated sample taken during each minute from the total volume of the expired air. A computer is included which accepts the gas analyzer data and the volume data, and which calculates and displays the oxygen uptake in the expired air for each minute, corrected to a standard temperature and pressure and dried (STPD). Utilizing the oxygen computer's output and an input of the subject's weight, an additional computer calculates and instantly displays the oxygen uptake per unit of weight of the subject.

In the respiratory gas analyzer be described, the air expired from the subject is passed through a precision bellows-type volume meter constructed to include a disc having a slotted circumference which passes between a light source and a photoelectric detector. Rotary motion is imparted to the disc by the expansion and contraction of two bellows used for a positive displacement measurement of the expired air volume. An electric pulse, indicative of the passage of a known volume of air, is generated by the meter each time a slot in the disc passes between the light and the light source. The volume computer totals these pulses at the end of each minute, so that the air expired during the preceding minute may be determined.

As mentioned, the volume meter is maintained in an oven so that the air passing through the meter may be held at a temperature slightly above body temperature for example at 40°C. The number of slots in the disc reflects the volumetric difference between a given amount of air at the oven temperature and standard temperature (0°C) thereby providing air volume data compensated to standard temperature conditions. Based on this data, the volume computer calculates the corresponding air volume at body temperature (37°C). Since the volume measurement is made on saturated air directly from the subject's lungs at ambient (body) pressure, no pressure correction to the data is necessary. As a result, the volume of expired air at BTPS conditions may be digitally displayed at the end of each minute.

In the operation of the system and apparatus of the invention, a sample of expired air proportional to the total volume of the expired air is extracted from the input to the volume meter during each minute for analysis by other components within the system. The air sample is then dried and mechanically passed to an oxygen measuring system which may be similar to the measuring system described, for example, in Copending application Ser. No. 235,540 filed Mar. 17, 1972, now U.S. Pat. No. 3,754,815. The oxygen measuring system described in the copending application uses the paramagnetic property of oxygen to measure the oxygen depletion in the gas sample. Specifically, the system of the copending application provides an electrical output which is a measure of the partial pressure of oxygen in the gas sample. The oxygen computer accepts the output of the oxygen analyzer and calculates the oxygen depletion at standard temperature and pressure conditions to provide the digital display of the volume of oxygen uptake at the end of each minute.

As will also be described, the system of the invention includes further computing equipment which accepts the oxygen uptake data from the oxygen computer, and which also responds to the subject's weight to calculate and digitally display the oxygen uptake per unit of the weight of the subject.

BRIEF DESCRIPTION OF THE DRAWINGS

FIG. 1 is a block diagram of the various components which are included in the illustrated embodiment of the improved respiratory air analyzer apparatus and system of the present invention;

FIG. 2 is a schematic representation of the mechanical, pneumatic and electrical components of a volume measuring sampling analysis apparatus which is included in the apparatus of FIG. 1;

FIG. 4 is a logic block diagram of a volume computer and associated display which are incorporated into the system of FIG. 1;

FIG. 5 is a series of waveforms which are present in various portions of the diagram of FIG. 4, and which are useful in explaining the operation of the volume computer of FIG. 4;

FIG. 6 is a schematic representation of a display panel in which the various displays of the system of FIG. 1 are mounted;

FIG. 7 is a sectional view of a sample and hold cylinder which is included in the measuring system of FIG. 2;

FIG. 8 is a block diagram of the logic incorporated into the sampling system of FIG. 2;

FIG. 9 is a block diagram of an oxygen measuring system which is incorporated into the system of FIG. 1, and which may be similar to the system disclosed, for example, in the aforementioned copending application;

FIG. 10 is a logic block diagram of an oxygen uptake computer and associated display which are incorporated into the system of FIG. 1;

FIG. 11 is a series of waveforms present in various portions of the block diagrams of FIGS. 9 and 10; and FIG. 12 is a block diagram of an oxygen uptake-per-unit weight computer which is included in the system of FIG. 1.

DETAILED DESCRIPTION OF THE ILLUSTRATED EMBODIMENT

Figure 3A:
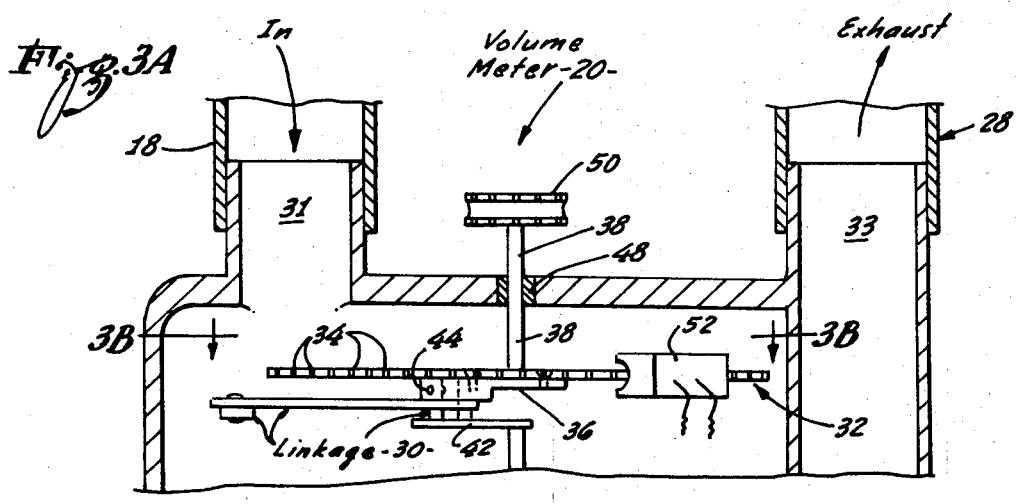
FIG. 3A is a fragmentary view, partly in section, of a gas meter which is included in the volume measuring apparatus of FIG. 2.

As mentioned above, the block diagram of FIG. 1 represents the various components of the improved apparatus and system of the present invention. As illustrated, the expired air from the subject is introduced into a volume measuring apparatus 1 which will be described in more detail in FIG. 2. The electrical output from the volume measuring apparatus is accepted by a volume computer 2 which will be described in more detail in conjunction with FIG. 4. The volume computer 2 uses the data from the volume measuring apparatus 1 to provide a measurement of the volume of expired air corrected to body temperature and ambient pressure, and the measurement is displayed digitally by a display 3.

A sampling apparatus 4, which also is shown in some detail in FIG. 2, is coupled to the measuring apparatus 1, and it derives a sample of the expired air from the measuring apparatus. The sampling apparatus then introduces the air sample to an oxygen cell 5, which may be of the type described in U.S. Pat. No. 2,416,334. The output from the oxygen cell 5 is applied to an oxygen measuring system 6 which, as mentioned above, may be similar to the measuring system described in the aforesaid copending application.

An oxygen uptake computer 7, which is shown in detail in FIG. 10, is coupled to the oxygen measuring system 6, and it computes the oxygen uptake of the expired volume corrected to standard temperature (0°C) and ambient pressure dry, and the result is displayed digitally by a display 8. The system also includes an oxygen uptake/unit weight computer 9 which responds to the calculations of the oxygen uptake computer 7, and to the weight of the subject, as set into a component 13, to display the oxygen uptake per unit weight on the digital display 11.

As mentioned above, the volume measuring apparatus 1, and sampling apparatus 4 are shown in FIG. 2, as well as the oxygen cell 5. In order to maintain known temperature conditions so as to facilitate compensation to established reference temperature standards, and to prevent condensation of water vapor, the components of FIG. 2 are housed in an oven 10. The interior of the oven, and the components therein are maintained at a known temperature, such as 40° C, by the thermostatically controlled introduction of heated air into the oven from a suitable heater 12 through a duct 14.

The subject's nostrils are held completely closed by a suitable nose clamp. Mouthpiece 16 which may be of known construction includes valving so that only outside air is drawn into the subject's lungs during inhalation of air, and expired air from the subject flows through a flexible tube 18 into a volume meter 20. In this way, the air expired by the subject during a given period of time is measured, and none of the expired air is removed by inhalation of the subject. A sample of the expired air, accurately proportionate to that entering the meter 20 is withdrawn from the tube 18 and through a tube 22 for analysis in order to determine the oxygen content of the expired air.

In order to assure that the expired air entering the oven 10 does not tend to lower the internal temperature of the oven, and to assure that the expired air entering the oven will attain the desired temperature prior to its entry into the meter 20, the heated oven air is exhausted to the atmosphere through a sheath 24 which surrounds the flexible tube 18. A shield 26 may be attached to the flexible tube 18 to deflect the exhaust over air from the subject's face.

The meter 20 may be a usual gas meter which is used to measure gas consumption, and which consists of two bellows (not shown) that are 90° out of phase with one another, and which are housed in individual chambers. Included as part of the bellows system in the usual prior art gas meter is a mechanical linkage 30, which is such that the expansion and contraction of the two bellows, caused by the passage of expired air through the meter, provides a clockwise rotary motion of a point A in FIG. 3B about a point B.

The meter 20 includes a disc, such as the disc 32, which is rotatably mounted at the point B, and which will turn in a clockwise direction as the point A rotates about the point B. Part of the expired air passing through the flexible tube 18 enters the meter 20 through an inlet 31 (as shown in FIG. 3A) and, after passing through the meter, is exhausted through an outlet 33 to a tube 28.

Figure 3B:
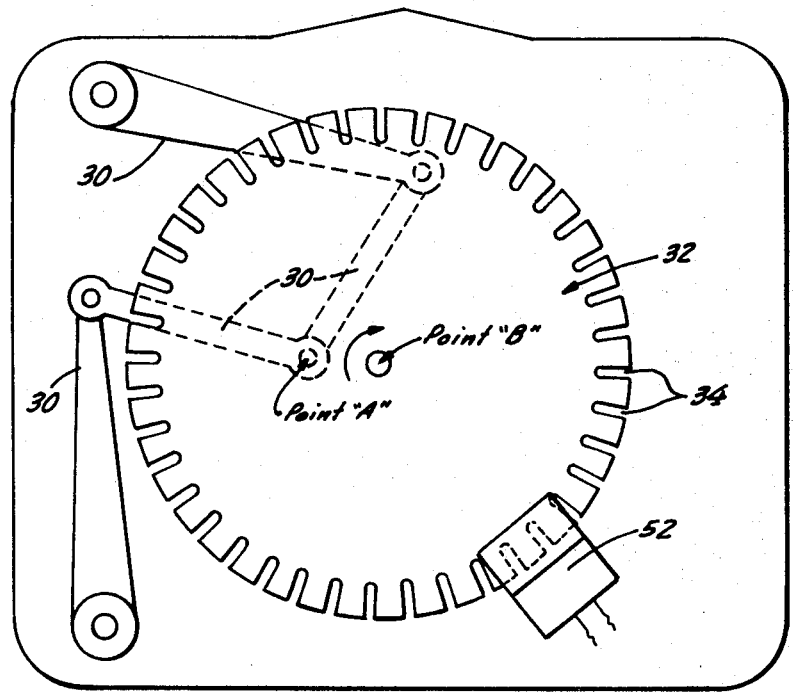
FIG. 3B is a view of the gas meter of FIG. 3A taken essentially along the line 3B—3B.

In the construction of the meter 20 of FIGS. 3A and 3B, a usual prior art volume meter is modified by installing a disc 32 with a plurality of slots 34 about the circumferential edge. The linkage 30 is coupled to the disc 32 (as shown in FIG. 3A) through an adapter 36. The disc 32 is attached to the adapter by screws 40. The adapter includes a drive shaft 38 which extends through a central hole in the disc 32. The adapter 36 is clamped to a pin 42 which is part of the linkage 30, this being achieved by means of a set screw 44. In this way, as the linkage 30 rotatably drives the disc 32, the drive shaft 38 is rotated by the disc in a clockwise manner above a vertical axis, insofar as the view of FIG. 3B is concerned. The drive shaft 38 extends through the housing of the meter 20, and is supported in the housing, for example, by a bushing 48 which also acts as an air seal. A sprocket 50 is mounted at the end of the shaft 38, as shown.

An edge scanner 52 is mounted within the meter 20 in position such that slotted edge of the disc 32 passes through the scanner. The scanner includes a light source mounted below the disc, and a photoelectric cell mounted above the disc. Each time one of the slots 34 of the disc 32 passes through the scanner, light from the light source is observed by the photoelectric detector, and an electric pulse is generated.

Because the linkage 30 is coupled to the bellows of the meter 20 by means of cranks, a constant flow rate of expired air imparts a non-uniform rotation rate to the disc 32. Moreover, a given incremental volume of expired air will result in different angular movements of the disc 32 at various points of the disc's annular travel. These non-uniformities may be compensated by changing the angular spacing of the slots 34 around the periphery of the disc 32 so that each pulse generated by the scanner 52 corresponds to a known volume of gas.

The number of slots 34 in the disc 32 is chosen so as to compensate for the proportional sample of expired air which is withdrawn for analysis through the tube 22, and also to compensate for temperature. As a result, although the volume of expired air is measured by the meter at the 40° Centigrade oven temperature, and although only a portion of the total volume of expired air is passed through the meter, because of the sample extraction, each generated pulse by the scanner 52 may be made to represent the exhalation by the subject of a known volume of air corrected to a standard temperature of, for example, 0°C.

In a constructed embodiment, the volume of expired air is established at 0.05 liters. The output from the meter 20 is introduced to the volume computer 2 so that the volume of expired air may be compensated to body temperature (37°C), and so that it may be converted to a more useable form for display purposes.

The volume computer 2 (as stated above) is shown in block form in FIG. 4. In the volume computer, each pulse generated by the scanner 52 is amplified in an amplifier 54 to a more useful level. The amplified output signal from the amplifier 54, as shown by the curve A of FIG. 5, is applied to a bistable multivibrator 56 which is used for shaping purposes, and which generates a pulse B in FIG. 5 with a sharp leading edge and trailing edge.

At this point, it should be stated that the various individual components shown in block form in FIG. 4 are commercially available units, and in and of themselves are well understood to the art. For example, the amplifier 54 may be of any appropriate design which provides a uniform gain to amplify the input pulse to a more useful level without distortion. The bistable multivibrator 56 likewise, may be a commercially available unit which is utilized for pulse shaping, wherein a sharp leading edge of an output pulse is generated when the input pulse potential exceeds the leading edge threshold value set into the multivibrator and the output pulse of the multivibrator remains positive until the potential of the input pulse falls below the trailing edge threshold set into the multivibrator.

The multivibrator 56 is connected to a monostable multivibrator 58. Each time the potential of the input of the monostable multivibrator rises above a preset level, it changes state for a predetermined short time interval, so that the potential at its output is high for that predetermined interval. As a consequence, the monostable multivibrator generates an output square wave pulse, such as shown by the waveform C of FIG. 5, in response to each input pulse from the bistable multivibrator 56. The output pulses from the monostable 58 are fed to the oxygen uptake computer 7, and also to a multiplier circuit 60.

The multiplier circuit 60 is made up of a flip-flop 62, a frequency divider 64, an "and" gate 66, and a clock signal generator 68. Each pulse from the monostable multivibrator 58 sets the flip-flop 62, and it remains set until reset by an output pulse from the divider 64 (waveform E in FIG. 5). Therefore, a signal such as shown by the waveform D in FIG. 5 appears at the output of the flip-flop 62 in response to each pulse from the multivibrator 58.

The set-up signal from the flip-flop 62 is applied to the "and" gate 66. The clock generator 68 applies a series of clock pulses, such as shown by the waveform F in FIG. 5, to the "and" gate. As a result, the "and" gate passes the clock pulses for the interval in which the flip-flop 62 is in its set state, and is shown by the waveform G of FIG. 5.

The signal from the "and" gate is passed to a divider-accumulator circuit 70, and is also applied to the divider 64. The divider 64 develops its output pulse E after the receipt of a predetermined number of pulses from the "and" gate, so as to reset the flip-flop 62 at that time, and disable the "and" gate. The frequency of the clock signal generator 68 is selected to be above the highest possible frequency of pulses generated by the scanner 52, so that it will be assured that the flip-flop 62 will be reset within the time interval between successive pulses from the scanner 52.

The signals from the "and" gate 66 (waveform G of FIG. 5) are applied to the divider-accumulator circuit 70 in order to complete the process of calculating the volume of expired air as compensated to a new reference temperature. The divider-accumulator circuit may comprise, for example, four frequency dividers 72, 74, 76 and 78, connected in series, and driving a flip-flop 80. The first frequency divider 72 is driven by the signals from the "and" gate 66, and it develops output pulses having a predetermined sub-multiple frequency of the input pulses.

The divisor in the frequency divider 72 is selected such that the number of output pulses from the divider 72 are indicative of the volumetric measurement of the total expired air in tenths of a measure at the new reference temperature.

The output pulses from the divider 72 drive the divider 74, and the latter divider generates an output pulse for each ten input pulses received from the divider 72. The pulses from the divider 74 are then processed by the divider 76 and 78 which, likewise, have divisors of ten. The output of the divider 78 drives the flip-flop 80. The arrangement is such that the divider 74 develops an output signal indicative of a 1/10 measure of volume at the new reference temperature, the divider 76 develops an output which is indicative of a unit measure of volume at that temperature, the divider 78 develops an output which is indicative of a measure of volume in tens, and the flip-flop 80 develops an output which is indicative of the volumetric measurement in hundreds.

The signals accumulated in the divider-accumulator circuit 70 are periodically released for storage in a first of two storage units 82 and 84 included in the volume computer 2. The storage units 82 and 84 may be usual flip-flop registers as are commonly used for the temporary storage of digital data. The storage unit 82 collects and stores the latest data accumulated in the divider-accumulator storage 70, and it periodically transfers its contents to the storage unit 84.

The transfer from the storage unit 82 to the storage unit 84 of data stored in the unit 82 from the preceding period, as well as the transfer of data from the divider-accumulator 70 to the storage unit 82 is accomplished by the receipt of the storage unit 82 of a positive pulse, such as the pulse shown by the waveform J of FIG. 5 and which is generated by a clock generator 86 at, for example, 60 second intervals. The latter clock signal is also introduced to the oxygen uptake computer 7, as will be described, and it is also used to reset the dividers 72, 74, 76, 78 and the flip-flop 80, after an appropriate delay in a delay circuit 88. The delay circuit 88 may comprise, for example, two usual monostable multivibrators, and it develops the signals shown by the waveform K of FIG. 5 delayed slightly with respect to the pulse J.

The action is such that at the end of each period, the contents of the storage unit 82 are transferred to the storage unit 84, and the contents of the divider-accumulator circuit 70 are then fed into the storage unit 82. To achieve this action, the clock generator 86 generates a clock pulse H which precedes the clock pulse J, and which is applied to the oxygen uptake computer 7, as shown in FIG. 4. The computer 7 in turn, applies a corresponding clock pulse I to the storage unit 84 which is slightly delayed with respect to the corresponding clock pulse H, but still occurs in advance of the corresponding clock pulse J by an interval, for example, of 10 seconds.

The clock pulse H from the generator 86 is used by the oxygen uptake computer 7, as will be described, to initiate the computation within the computer, and the computer generates the corresponding clock signal I at the completion of the computation. Since the time required to accomplish the oxygen uptake computation is dependent upon the volume of air expired during the corresponding period, the calculation may take, for example, up to 5 seconds to complete. Therefore, the delay of the I signal with respect to the H signal may vary for different periods, but in all cases will follow the H signal by some finite interval up to, for example, 5 seconds.

As mentioned above, the data in the storage unit 82 is transferred to the storage unit 84 upon the receipt of the clock signal of the I clock signal, and this data is released to a decoder 90 which converts, in usual manner, the binary coded digital output from the storage unit 84 into a form appropriate for energizing the display devices, such as Nixie tubes in the display 3. The display 3, and as shown in FIG. 6, thereby displays the total volume of air for each successive period of hundreds, tens, units and tenths of a measure expired by the subject during each one minute period, and compensated to a new reference temperature at ambient pressure saturated with water vapor.

With the pressure remaining constant, the basic relationship between volume and temperature becomes:

$$V_1/T_1 = V_2/T_2 \ldots \quad (1)$$

where: $V_1$ is the number of pulses generated in a given period by the multiplier circuit 60, with each pulse representing approximate 0.05 liters of expired air, and where $T_1$ equals 0°C, $V_2$ is the volume to be displayed on the display 3, and $T_2$, for example is 37°C.

Therefore:

$$V_2 = 363/6400 \, V_1 \ldots \quad (2)$$

The equation (2) is implemented by the volume computer 2 of FIG. 4, wherein a value of 363 is given for the divisor of the frequency divider 64, so that each incoming volume pulse is multiplied by 363 in the multiplier circuit 60; and the divider 72 in the divider-accumulator circuit 70 has a divisor of 640, so that the resulting pulses from the multiplier circuit 60 may be divided by that value. The remaining dividers 74, 76, 78 and flip-flop 80 in the divider-accumulator circuit 70 merely process the pulses from the frequency divider 72 for presentation by the display 3 in hundreds, tens, units and tenths of a liter for each minute.

As mentioned above, a portion of the expired air is periodically processed by withdrawing a sample through the tube 22 of FIG. 2, and an analysis is made to determine the oxygen depletion in the sample. In order that the extractions of the samples will not adversely affect the accuracy of the air volume measurements, compensation is made in the number of slots on the periphery of disc 32.

The sample analyzing system is also shown in FIG. 2, and it includes a hold and sample cylinder 98 which is shown in detail in FIG. 7. The sample withdrawn from the expired air through a tube 22 is introduced into the cylinder 98 through a solenoid valve 94 and through a tube 96. The solenoid 94 is controlled so that it is open for a selected period to permit the extracted sample of the expired air to flow into the cylinder 98. The flow of the sample into the cylinder 98 is controlled by the rotary motion of the sprocket 50, which as described above is driven by the meter 20, and which is used to drive a piston 132 (FIG. 7 in the sample chamber of the hold and sample cylinder 98.

The rotary motion of the sprocket 50 is transferred to a driven sprocket 100 by use of an endless sprocket type positive drive belt 102 which is routed around the sprockets 50 and 100, and over a pair of idler sprockets 104 and 106. The idler sprockets are included to accommodate a 90° difference in the planes of the sprockets 50 and 100, in the illustrated embodiment. The rotary motion of the driven sprocket 100 is imparted to a drive shaft 108 on which the sprocket 100 is mounted. The shaft 108 is coupled through an electromagnetic clutch 110 to a shaft 112. The shaft 112 is also coupled through an electromagnetic clutch 114 to the drive shaft 122 of an electric motor 124. A pinion gear 116 is mounted on the shaft 112, and it drives a rack 118 which is integral with a piston rod 120 connected, and shown in FIG. 7 to the piston 132.

When an electric current is applied to the electromagnetic clutch 110 to activate the clutch, the drive shaft 108 is caused to turn the pinion 116 so as to drive the rack 118 and piston 132. This results in downward movement of the piston 132 which causes the sample of expired air to be drawn into the hold and sample cylinder 98 through the tube 22, and through the solenoid valve 94 and tube 96. Then, the electromagnetic clutch 110 is deactivated and the electromagnetic clutch 114 is activated, so that the motor 124 may drive the piston 132 through the pinion 116 and rack 118. This causes the piston to move upwardly in the sample chamber to exhaust the air sample from the sample chamber into the hold chamber of the cylinder 98.

As shown in FIG. 7, the piston rod 120 passes through an aperture 130 in the base of the hold and sample cylinder 98 and attaches to the piston 132 within the sample chamber of the cylinder. The sample chamber is divided into two pneumatically separate sections 134 and 136 by the piston 132. The section 134 has a single passage for the flow of air through an opening 137 into a tube 139. As shown in FIG. 2, the tube 139 is connected to an expired air reservoir 135 which is vented to the atmosphere through a tube 141 to provide for pressure equalization with the expired air regardless of the movement or position of the piston 132 in the cylinder 98. The section 136, on the other hand, has two orifices for the passage of the expired air sample, namely an opening 138 which is interconnected to the input sample tube 96, and an orifice 140 which is part of a ball check valve.

When the solenoid valve 94 of FIG. 2 is open, a downward movement of the piston 132 causes the air sample to be drawn into the section 136 through the inlet opening 138. At this time, a ball 142 of the check valve is seated in the orifice 140 preventing air movement down through that orifice into the section 136. Then, when the solenoid valve 94 is closed, upward movement of the piston 132 causes the air in the section 136 to be expelled through the orifice 140 and through the ball check valve into the upper, hold chamber 144 of the cylinder 98. The hold chamber 144 is separated from an upper chamber 146 by the presence of a floating piston 148. Both pistons 132 and 148 form appropriate air seals with the inner wall of the sample and hold cylinder, so as to prevent the flow of air between the upper and lower sections in each of the cylinder chambers.

The chamber 146 is vented for the expired air by means of a tube 150 which extends to the expired air reservoir 135 of FIG. 2. This assures that any leakage of air around the piston 148 into the chamber 144 will have a minimal effect on the oxygen content of the air sample in a chamber 144, which is ultimately applied to the oxygen cell 5 for analysis. With this venting to minimize the pressure resistance to the travel of the piston 148, the piston 148 will move in an upward direction due to the force developed when the expired air sample is introduced into the chamber 144 through the orifice 140 as the piston 132 is moved to its upward position.

The chamber 144 has a first outlet 154 which is coupled to a tube 156, and which supplies the expired air to the oxygen cell 5. The chamber 144 has a second output port 158, which is opened only when the piston 148 is positioned and held above that port. The port is connected to a tube 160, which, in turn, is coupled to the expired air reservoir 135.

Therefore, as the expired air sample is forced into the chamber 144 by the upward movement of the piston 132, the air in the sample is bled from the chamber 144 through the opening 154 at a rate controlled by a restriction in the tube 156. This rate is appreciably below the rate at which the sample is forced through the orifice 140 into the chamber 144, and the pressure of the remaining volume of expired air in the chamber 144 causes the piston 148 to move vertically until the port 158 is opened permitting the air to be vented through the reservoir 135 to the atmosphere with a resultant pressure loss in the chamber 144.

At the completion of the upward stroke of the piston 132, the ball 142 reseats in the orifice 140 sealing the chamber 144 from the chamber 136 during the downward stroke of the pistons. The floating piston 148 now moves downwardly in the chamber 144 closing the port 158 while continuing to force the expired air samples through the passage 154 into the tube 156. The sample then passes through a solenoid valve 159 and through a dryer 157 to the oxygen cell 5, and thence it is exhausted to the atmosphere through a tube 163.

As the piston 132 leaves its uppermost position, the switch 126 opens. If the piston reaches its lowermost position, the rack 118 opens a switch 128, which disengages clutch 110 and allows solenoid valve 94 to close. Receipt of a J pulse resets flip-flop 129 thereby engaging the clutch 114 to connect the motor 124 to the piston 132. At the same time, the clutch 110 is disengaged, and the solenoid valve 94 is closed, so that the piston may be returned to its uppermost position, and the cycle reinitiated.

The electrical control of the solenoid valve 94 and of the electromagnetic clutches 110 and 114 in FIG. 2 is effectuated by the circuitry of FIG. 8. The circuitry is controlled, for example, by a normally open microswitch 126 and by a normally closed microswitch 128 which are under the control of the rack 118, as shown in FIG. 2, as well as the J pulse generated by the clock generator 86 of FIG. 4. In the circuit of FIG. 8, the microswitch 126 is included in the set input line to a flip-flop 129, the set output of which is fed through a driver 131 and through the normally closed microswitch 128 to the coil of the normally closed solenoid switch 94, and also to the normally disengaged clutch 110. The J signal from the clock generator 86 is applied to the reset input terminal of the flip-flop 129, and the reset output of the flip-flop is connected through a driver 133 to the clutch 114.

With the closure of the microswitch 126, a high potential is applied to the set input terminal of the flip-flop 129 which sets the flip-flop and results in a high potential at its set output terminal. This output is fed through the driver 131 to energize the solenoid valve 94 and the electromagnetic clutch 110, thereby engaging the clutch and opening the solenoid valve. The clutch 114 is disengaged at the same time due to the low potential of the reset output of the flip-flop 129.

The closure of the microswitch 126 occurs when the piston 132 is in its uppermost position, as shown in FIG. 7 and, under these circumstances, the sprocket 50 of FIG. 2 drives the piston downwardly towards its lower position and, since the valve 94 is open, a sample of expired air is drawn into the sample chamber of the cylinder 98. This downward movement of the sampling air continues until it is stopped by the opening of the microswitch 128, or reversed by the receipt of a J pulse. The microswitch 128 is opened due to the action of a cam which is an integral part of the rack 118, and this opening of the microswitch 128 occurs when the piston is in its lowermost position. The microswitch 128 is a protective device to prevent damage to the drive mechanism which could occur if an excess amount of air is expired during any one period, and its activation is extremely rare. The activation of the switch 128 disengages the clutch 110 and closes the solenoid 94, so that the piston 132 stops at its bottom limit, and no more air flows into the sample cylinder.

The receipt of a J pulse from the clock generator 86 during the downward movement of the piston, causes flip-flop 129 to become reset, and thereby causes the electromagnetic clutch 114 to engage, and the electromagnetic clutch 110 to disengage and the solenoid 94 to close. Under these conditions, the shaft 112 is rotated in the opposite direction by the motor 124, to return the piston 132 to its uppermost position, thereby forcing the air sample from the sample chamber into the hold chamber 114. This upward movement of the piston 132 continues until the microswitch 126 is again closed by a cam on the rack 118, causing the cycle to be repeated.

since the revolutions of the shaft 112 have a direct and known ratio to the cycles of the bellows in the volume meter 20, the displacement of the piston 132, or the volume of each sample of air, will be proportional to the total volume of expired air measured in the volume meter 20 during each one minute period.

The exact physical equation for calculating the oxygen depletion from a volume of expired air is relatively complex and the electronic circuit required to implement the equation likewise would be complex. For the present application, however, the exact equation can be simplified by the use of certain proven assumptions and without serious loss of accuracy in the computation. A simplified equation may be expressed as follows:

$$\dot{V}_{O_2} = \dot{V}_e (K_1 + P' + K_3 P'_m)/K_2 \dots \quad (3)$$

where: $\dot{V}_{O_2}$ is the normalized volume of oxygen uptake per unit time; $\dot{V}_e$ is the volume of expired air per same unit time; $K_1$, $K_2$ and $K_3$ are constants; $P'$ is normalized, ambient pressure; and $P'_m$ is normalized oxygen partial pressure reduction.

For the determination of the oxygen partial pressure reduction ($P'_m$), the expired air sample transferred to the hold chamber 144 of the cylinder 98 is exhausted first to the oxygen cell 5 with the excess air being passed to the reservoir 135 through the tube 160. The oxygen cell 5 shown in FIG. 9, and as mentioned above, may be of the type described in the aforesaid patent, in which the magnetic susceptibility of oxygen is utilized to determine the oxygen partial pressure in the air sample. Since the water vapor content of the air sample will affect the oxygen content measurement by the oxygen cell 5, and since it is desired to calculate and display the oxygen uptake corrected to standard temperature and pressure reference dry, the air sample is passed through a tube 156, solenoid valve 159 and drying cell 157 in FIG. 2, with substantially all water vapor being removed from the sample prior to its entry into the oxygen cell 5.

In the type of oxygen cell described in the aforesaid U.S. Pat. No. 2,416,334, the angular position of a mirror 171 is an indication of the oxygen partial pressure in the air sample. The angular position of the mirror is measured by the system shown in FIG. 9, which is more fully described in the aforesaid copending application.

As shown in FIG. 9, a cathode-ray tube 164 and photomultiplier detector 166 are positioned relative to the mirror 171 such that an optical path is provided between the cathode-ray tube, the mirror, and the photomultiplier. Transmitted along this optical path is the linear horizontal sweep of the cathode-ray tube, the trace of which is deliberately widened along the vertical axis. The arrival time at the photomultiplier detector of a portion of the sweep is a function of the angular position of the mirror, and hence the oxygen partial pressure in the air sample. The trace of the sweep is focused on a pin hole 175 in a plate 176 by lenses 172 and 174, and the portion of the trace reflected through the pin hole varies depending upon the angular position of the mirror 171. The resulting output from the detector 166 is conditioned in an amplifier filter 176 so as to produce a pulse P which is applied to the oxygen uptake computer of FIG. 10.

It will be seen that the time interval between the triggering of the sweep and unblanking generator 165 of FIG. 9 by the introduction of an H clock pulse and the generation of the P output signal, is a measure of the oxygen partial pressure of the air sample passing through the cell 5, as compared with the oxygen partial pressure of a calibration standard. To effectively measure this time interval, the H pulse and the P pulse are applied to a flip-flop 180 in the oxygen uptake computer of FIG. 10, these pulse being shown in the waveforms of FIG. 11.

The flip-flop 180 in FIG. 10 is set upon the receipt of each H pulse, and remains set until the receipt of the corresponding P pulse. The output from the flip-flop is a pulse Q shown by the waveform in FIG. 11, and whose duration represents a time interval corresponding to the oxygen uptake of the sample. The set output signal of the flip-flop 180, as represented by the waveform Q in FIG. 11, is applied to a monostable multivibrator 182 and to an "and" gate 184 of the oxygen uptake computer 7 of FIG. 10. The other input signal to the "and" gate 184 is derived from a clock generator 192, the clock generator providing calibration clock pulses as shown by the waveform R of FIG. 11. The repetition frequency of the clock pulses R is established to correspond with the calibration and response rate of the measuring system of FIG. 9.

The "and" gate 184 produces a burst of pulses when the flip-flop 180 is in its set state, as represented by the waveform X in FIG. 11. The number of pulses in the burst is indicative of the oxygen uptake in each air sample. The S signal is fed into an oxygen pressure normalizing and adder circuit 194 whose output represents the term $(K_1 + P' + K_3 P'_m)$ in the foregoing Equation (3).

As mentioned, the Q signal from the flip-flop 180 is also introduced to the monostable multivibrator 182 and causes that multivibrator to produce an output pulse represented by the waveform T in FIG. 11. The T pulse is applied to the set input terminal of a flip-flop 186 to set the flip-flop. The flip-flop 186 remains in its set state until it receives a pulse from a presettable down counter 188, the latter pulse being represented by the waveform I in FIG. 11. As a result, the flip-flop 186 generates an output pulse represented by the waveform V in FIG. 11, and which is applied to an "and" gate 190.

The C signal from the monostable multivibrator 58 of the volume computer 2 of FIG. 4 is applied to a counter 196, and the J clock signal from the clock generator 86 of the volume computer is applied to the presettable down counter 188. In addition, the J signal is applied to an ambient pressure normalizing sequencer 213 in the circuit 194, and the H signal from the clock generator is also applied to the sequencer.

The counter 196 is a usual binary counter, and it serves to count the successive C pulses received from the volume computer. On the receipt of the previous J signal by the presettable down counter 188, which is interconnected with the counter 196, the data concerning the number of C signal pulses received during the preceding minute is transferred to the counter 188, and this number is reduced in the counter 188 2y subtractzng pulses received by the uown counter from the "and" gate 190. These latter pulses are designated by the waveform X in FIG. 11, ]nd they constitute clock pulses W received from a clock generator 198, and gated by the "and" gate 190.

The output of the counter 188 is the pulse signal I which is introduced to the storage 84 of the volume computer 2 in FIG. 4, and which is shown both on the waveforms of FIG. 5, and in the waveforms of FIG. 11. The I signal is used in the oxygen uptake computer 7, as mentioned above, to reset the flip-flop 186. Each pulse of the I signal occurs when the number of pulses in the C signal have been counted down to zero by the X pulses from the "and" gate 190. The timing of each pulse in the I signal will vary in accordance with the number of C pulses accumulated in each period.

The rate of pulse generation by the clock generator 198 is set to be fast enough that the counter 188 can be counted down from its maximum number to zero in approximately 5 seconds, yet slow enough to permit calculations to take place between pulses later in the oxygen uptake computer. It can thus be seen that the X signal output from the "and" gate 190 contains the same number of positive pulses as the C signal derived from the volume computer and which indicates the volume of expired air but with the information presented on a reduced time basis.

Since the calculation of oxygen uptake involves the volume of air expired during a period, $(\dot{V}_e)$ is one term of the equation, and the sum of the normalized oxygen partial pressure reduction, the normalized ambient pressure and a constant $(K_1 + P' K_3 P'_m)$ is another term, circuitry is included in the computer of FIG. 10 to multiply these terms together, as is required by the equation.

The latter circuitry includes a flip-flop 200 which is controlled by the X signal from the "and" gate 190, and which feeds its output to an "and" gate 202. A clock generator 204 also supplies clock pulses to the "and" gate, and the output of the "and" gate is connected to a presettable down counter 214. The output from the down counter (waveform Y in FIG. 11) serves to reset the flip-flop 200, so that its output is represented by the waveform Z in FIG. 11. The clock pulses from the clock generator 204 are represented by the waveform AA in FIG. 11, and the output from the "and" gate 202 is represented by the waveform BB.

With the introduction of the X signal, shown in an expanded time frame on the line X' of FIG. 11, to the set input terminal of the flip-flop 200, a positive pulse output is initiated from the flip-flop which remains until the flip-flop is reset by the Y signal from the counter 214. Since the number of pulses in the X signal is indicative of the volume of expired air, the Y signal, as will be explained, is indicative of the normalized oxygen partial pressure reduction in the expired air and the normalized ambient pressure during the same period. The duration of each pulse from the flip-flop 200, as shown by the waveform Z in FIG. 11, is therefore a function of the normalized ambient pressure and the partial pressure reduction.

As described, the Z signal is fed to the "and" gate 202 together with the output AA of the clock generator 204, so that the signal BB is an effective multiplication of the two values since each pulse in the X signal is indicative of the passage of a quantity of expired air and the duration of each Z pulse developed is an indication of the partial pressure reduction. The resulting BB signal is fed to the down counter 214 in the circuit 194 as well as to a divider circuit 216.

The oxygen pressure normalizing and adder circuit 194 contains, in addition to the counters 206 and 214, and the ambient pressure normalizing sequencer 213, an inverter 212, a storage register 210 and a binary adder 208. The S signal is fed to the counter 206, and the output of the counter is fed to the binary adder 208 and to the inverter 212. The counter 206 is a usual binary counter, and it provides a parallel output of a binary number representing the total number of S signal pulses received. The binary adder 208 receives a first input from the counter 206, and a second input from the storage register 210. The contents of the storage register 210 are determined during a special pressure normalization cycle initiated, for example, by a reset switch. This normalization cycle is initiated only when a significant change in ambient pressure may have occurred.

The activation of the reset switch repositions the solenoid valve 159 of FIG. 2 controlling the entry to the drying cell 157 and the subsequent entry to the cell 5 of the expired air, so that the undepleted air from the interior of the oven 10 which is at a slightly higher pressure than ambient will fill the oxygen cell through tube 155. When the cell is filled, the solenoid valve 159 automatically returns to its normal operating position connecting tube 156 to the dryer 157. The oxygen cell 5 now contains air at ambient pressure and with 21 percent oxygen until a new sample is introduced from chamber 144.

The cathode-ray tube's sweep in the measuring system 6 of FIG. 9 is now initiated to obtain a measure of the normalized oxygen partial pressure, and that reading is stored in the counter 206. The output of the counter 206 is applied as a data input through the inverter 212 to the storage register 210.

A read signal from the ambient pressure normalizing sequencer 213 developed from the T signal applied thereto is fed to the storage register 210 causing the output of the inverter 212 to be read into the storage register. The storage register 210 is now set to a binary number representative of the normalized ambient pressure, so that the ambient pressure normalization cycle is completed.

When the outputs from both the counter 206 and storage register 210 are received by the binary adder 208, the adder develops an output binary number which is the sum of the two inputs, and this latter number is applied to the down counter 214 to set the down counter accordingly. The down counter 214 may comprise 14 stages, and it develops the output signal Y from the thirteenth stage each time the number introduced to the counter from the binary adder 208 is counted down to zero by the subtraction of the pulses in the signal BB which are applied to the counter.

With the Y signal from the counter being used to reset the flip-flop 200, the output of the flip-flop and therefore the output of the "and" gate 202 is a function of the term in the aforesaid equation involving the reduction in oxygen partial pressure, the ambient pressure and a constant $(K_1 + P' + K_3 P'_m)$.

As shown in FIG. 10, the Y signal from the down counter 214 is also fed back to the down counter as a load pulse to reload the output of the adder 208 into the counter for the next cycle. In order to complete the calculation for the oxygen uptake, and to convert the information contained in the output of the "and" gate 202 to a more useable form, the output (BB) is applied to a divider circuit 216 which comprises four accumulator dividers 218, 219, 220 and 222 in series, together with accumulator 224. The dividers 218 and 219 have predetermined numbers D3 and D4 as respective divisors. As shown in FIG. 10, the output of the divider 218 is fed into the oxygen uptake per unit weight computer 9 of FIG. 12.

The succeeding two accumulator-dividers 220 and 222 in the circuit 216 each have the number 10 as a divisor, so that they, and the accumulator 224 present the data in units, tenths, and hundreds of a measure. The outputs from the divider circuit 216 are stored in a conventional storage unit 226 pending release through a usual binary-decimal decoder to the digital display 8 of FIG. 6. The release of data from the storage unit 226 is initiated upon the receipt of the same I signal which releases the result of the volume computer 2 of FIG. 4 to its display 3. Therefore, the oxygen uptake is displayed each minute simultaneously with the display of the volume of the expired air for that same minute.

The exact physical equation for calculating the oxygen depletion in a volume of expired air may be simplified without serious loss of accuracy in the computation. For a typical case, the equation can be expressed as follows:

$$\dot{V}_{O2} = (P' + 49P'm - 8192) \dot{V}_e 798200 \ldots \quad (4)$$

where:

$\dot{V}_{O2}$ = normalized volume of oxygen uptake per unit time, $P'$ = ambient pressure normalized, $P'm$ = reduction in oxygen partial pressure normalized, $\dot{V}_e$ = number of volume pulses of expired air, per unit time.

In the oxygen uptake computer 7 of FIG. 10, it may be seen that the volume of expired air is introduced in the form of pulses in the C signal from the volume computer, and presented in a condensed time frame as the X signal from the "and" gate 190. The normalized ambient pressure ($P'$) is the output of the storage register 210 in the oxygen pressure normalizing and adder circuit 194. The multiplication of the normalized oxygen partial pressure reduction ($P'm$) by a factor of 49 is accomplished by the passage of the clock pulses R through the "and" gate 184 for the duration of the Q signal which represents the partial pressure reduction. The addition of $P'$ and $49P'm$ is accomplished by the adder 208.

The subtraction of the constant 8192 was accomplished by virtue of taking the output from the down counter 214 from the next to last, or thirteenth stage. The pressure and volume terms of the equation are multiplied in the circuit of the flip-flop 200, clock generator 204 and "and" gate 202. The implementation of the equation is completed by having D3, the divisor of the divider 218 in the circuit 216 equal to 2, and D4, the divisor of the divider 219 equal 3991. As mentioned, the divisor in each of the remaining dividers 220 and 222, and in the accumulator 224, is to provide for the presentation of the volume of oxygen uptake in units, tenths and hundreds of a liter each minute.

For the computation and display of the oxygen uptake per unit of the subject's weight, the oxygen uptake/unit weight computer 9 of FIG. 12 is included in the system.

The oxygen depletion data from the oxygen uptake computer 7 is introduced into the computer 9 as the signal CC from the divider 218 in the circuit 216 of the oxygen uptake computer. The subject's body weight is set into a digital dial switch 13. The timing signal I from the oxygen uptake computer is used to release the computations of the computer 9 from a storage device 248 through a decoder 250 to the display 11 of FIG. 6.

In the system of FIG. 12, the subject's weight is set into the digital switch 213 with the resultant introduction of binary coded decimal signals into a divider circuit 234. These three binary coded decimal numbers corresponding to the subject's weight in pound, 10 pound and 100 pound increments, are fed into three down counters 236, 238 and 240 respectively. When these numbers are loaded into the respective down counters, the oxygen uptake data as represented by the waveform CC of FIG. 11 is fed into the divider circuit, and an output pulse is developed by the divider circuit each time all three of the counters 236, 238 and 240 have been counted down to zero by the pulses of the CC signal.

The output signal from the divider circuit 234 is fed back into each of the down counters to reload the output of the digital switch 13 into the counter, and so as to continue the computation, and it is also fed into a divider 242. The divider 242 has a number D5 as a divisor, this number is selected so that the output of the divider 242 will be in the form of a burst of pulses representative of the oxygen uptake per unit weight in the desired units of measure.

The output of the divider 242 is fed to divider 244 in which the input pulses are divided by 10 to establish the value of the oxygen uptake per weight to be displayed by the unit's section of the display 11. The output of the divider 244 is fed to an accumulator 246 to establish the value to be displayed in the tens section of the display 11. As before, the I signal is fed to the storage unit 248 so that an information fed to the display 11 will occur simultaneously with the information fed to the displays 3 and 8 of FIG. 6.

The invention provides, therefore, an improved respiratory gas analyzer-computer which automatically measures and instantaneously displays the volume of expired air from a subject, as well as the oxygen uptake in the expired air, and which also calculates and then instantly displays the oxygen uptake per unit of weight of the subject during a given period of time. The system of the invention displays the aforesaid parameter instantaneously and without the need for arduous manual calculations. Moreover, the system and apparatus of the invention is easy to operate, and requires no particular technical skills.

It will be appreciated that while a particular embodiment of the invention has been shown and described, modifications may be made. It is intended in the following claims to cover all modifications which fall within the spirit and scope of the invention.

I claim:

1. A respiratory gas analyzer for measuring and displaying oxygen uptake in the air expired by a subject for each of a succession of predetermined time intervals, said gas analyzer including: positive displacement volume metering means for producing electric output pulses representative of the volume of air expired by the subject at standard temperature and ambient pressure; a mouthpiece coupled to said volume metering means to enable the subject to introduce his expired air into the volume metering means; volume computing means electrically coupled to said volume metering means and responsive to the electric output pulses therefrom for generating a series of electric pulses representative of the volume of air expired by the subject during each of the successive time intervals; sampling means controlled by said volume metering means for deriving samples of the expired air from the input of the volume metering means with each sample being proportional to the total volume of the expired air passed through the volume metering means; oxygen measuring means coupled to the sampling means for measuring the partial pressure of oxygen in each of the samples and for producing electric output pulses representative of such partial pressure; oxygen uptake computing means coupled to said volume computing means and to said oxygen measuring means and responsive to the electrical output pulses therefrom to calculate the oxygen uptake in the samples at standard temperature and ambient pressure during each of the successive time intervals; and display means coupled to said uptake computing means for displaying the volume of oxygen uptake at the end of each of the time intervals under standard temperature and ambient pressure conditions.

2. The combination defined in claim 1, in which said oxygen uptake computing means implements the following equation:

$$\dot{V}_{02} = (\dot{V}_e (K_1+P'+K_3P'_m)/K_2$$

where: $\dot{V}_{02}$ = normalized volume of oxygen uptake per unit time;

$P'$ = ambient pressure normalized;

$P'_m$ = reduction in oxygen partial pressure normalized;

$\dot{V}_e$ = number of volume samples of expired air passing through the measuring means for each time interval;

$K_1$, $K_2$ and $K_3$ are constants.

3. The combination defined in claim 2, and which includes pressure normalizing circuit means included in said uptake computing means, and means coupled to said pressure normalizing circuit means for introducing electric pulses thereto representative of ambient pressure normalized ($P'$).

4. The combination defined in claim 1, in which said measuring means includes an oxygen cell for measuring said partial pressure, and which includes oven means for said volume metering means and for said oxygen cell for maintaining said sample at a predetermined temperature above normal body temperature.

5. The combination defined in claim 4, and which includes drying means interposed between said sampling means and said oxygen cell for removing substantially all water vapor from the samples prior to their entry into the oxygen cell.

6. The combination defined in claim 1, and which includes manually operable digital switching means controllable to a setting representative of the weight of the subject, and further computing means coupled to said switching means and to said oxygen uptake computing means for computing the oxygen uptake for unit weight of the subject.

* * * * *